United States Patent
Salot et al.

(10) Patent No.: US 10,841,745 B2
(45) Date of Patent: Nov. 17, 2020

(54) LOCATION REPORTING OF USER EQUIPMENT IN A CELLULAR NETWORK ENVIRONMENT

(71) Applicant: Cisco Technology, Inc., San Jose, CA (US)

(72) Inventors: Nirav Salot, Pune (IN); Sebastian Speicher, Wallisellen (CH); Aeneas Sean Dodd-Noble, Andover, MA (US); Sridhar Bhaskaran, Coimbatore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/103,491

(22) Filed: Aug. 14, 2018

(65) Prior Publication Data

US 2019/0007791 A1    Jan. 3, 2019

Related U.S. Application Data

(63) Continuation of application No. 14/572,268, filed on Dec. 16, 2014, now Pat. No. 10,051,408.

(60) Provisional application No. 62/010,684, filed on Jun. 11, 2014.

(51) Int. Cl.
  *H04W 4/02* (2018.01)
  *H04W 4/029* (2018.01)
  *H04W 4/021* (2018.01)
  *H04W 4/20* (2018.01)

(52) U.S. Cl.
  CPC .......... *H04W 4/029* (2018.02); *H04W 4/021* (2013.01); *H04W 4/20* (2013.01)

(58) Field of Classification Search
  CPC ......... H04W 4/02; H04W 8/10; H04W 64/00; H04L 67/18; H04L 67/22
  See application file for complete search history.

(56) References Cited

U.S. PATENT DOCUMENTS

| | | |
|---|---|---|
| 8,588,822 B1 | 11/2013 | Bhattacharya et al. |
| 8,644,857 B2 | 2/2014 | Chen et al. |
| 8,665,858 B2 | 3/2014 | Weill et al. |
| 8,670,342 B2 | 3/2014 | Norefors et al. |
| 8,818,404 B2 | 8/2014 | Brisebois |
| 10,051,408 B2 | 8/2018 | Salot et al. |
| 2006/0105788 A1 | 5/2006 | Duan et al. |

(Continued)

*Primary Examiner* — Minjung Kim
(74) *Attorney, Agent, or Firm* — Patterson + Sheridan, LLP

(57) ABSTRACT

An example method is provided in one example embodiment and includes receiving, by a user equipment device, a list including at least one location identifier associated with an area for location reporting and an area identifier identifying the area for location reporting. The method further includes receiving a location identifier broadcast by a wireless network element, and determining whether the broadcast location identifier matches the at least one location identifier associated with the area for location reporting. The method further includes sending a location reporting message by the user equipment device to a first network node when it is determined that the broadcast location identifier matches the at least one location identifier associated with the area for location reporting. The location reporting message is indicative of the user equipment device either entering or exiting the area for location reporting.

14 Claims, 5 Drawing Sheets

(56) References Cited

U.S. PATENT DOCUMENTS

| | | | |
|---|---|---|---|
| 2006/0258369 A1* | 11/2006 | Burroughs | G01S 5/0205 455/456.1 |
| 2011/0021212 A1 | 1/2011 | Chen et al. | |
| 2012/0307732 A1 | 12/2012 | Olsson et al. | |
| 2013/0195003 A1 | 8/2013 | Lee et al. | |
| 2014/0092871 A1 | 4/2014 | Wang et al. | |
| 2016/0259956 A1* | 9/2016 | Wassingbo | H04W 4/029 |

* cited by examiner

LOCATION REPORTING OF USER EQUIPMENT IN A CELLULAR NETWORK ENVIRONMENT

CROSS-REFERENCE TO RELATED APPLICATION

This application claims the benefit of priority under 35 U.S.C. § 119(e) to U.S. Provisional Application Ser. No. 62/010,684 entitled "LOCATION REPORTING OF USER EQUIPMENT IN A CELLULAR NETWORK ENVIRONMENT" filed Jun. 11, 2014, which is hereby incorporated by reference in its entirety.

TECHNICAL FIELD

This disclosure relates in general to the field of communications and, more particularly, to location reporting of user equipment in a cellular network environment.

BACKGROUND

The location of the user equipment within the mobile network is an important piece of information for location based policy and charging. The 3rd Generation Partnership Project (3GPP) has defined a mechanism for reporting the location of the UE with cell level granularity since the beginning of the Evolved Packet System (EPS) architecture. Besides basic use cases of location reporting for use in location based policy and charging, new use cases have emerged which require network to have the current location of the user equipment. One type of use case that has emerged is the use of the location of the user equipment for delivering push type services such as for pushing offers and advertisements to the user equipment based upon the location of the user equipment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
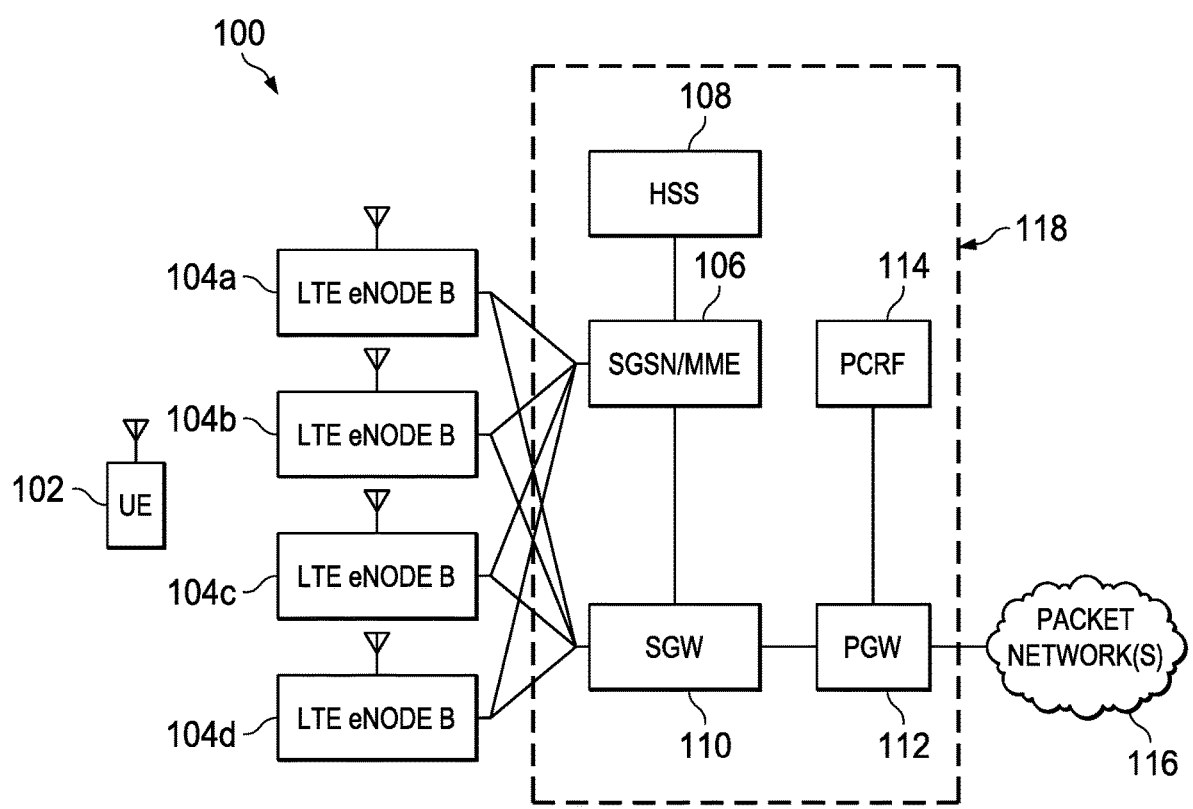
FIG. 1 is a simplified block diagram of a communication system 100 for location reporting of user equipment in a cellular network environment in accordance with one embodiment of the present disclosure.

An example method is provided in one example embodiment and includes receiving, by a user equipment device, a list including at least one location identifier associated with an area for location reporting and an area identifier identifying the area for location reporting. The method further includes receiving a location identifier broadcast by a wireless network element, and determining whether the broadcast location identifier matches the at least one location identifier associated with the area for location reporting. The method further includes sending a location reporting message to a first network node when it is determined that the broadcast location identifier matches the at least one location identifier associated with the area for location reporting. The location reporting message is indicative of the user equipment device either entering or exiting the area for location reporting.

In more specific embodiments, the location reporting message includes the area identifier and an identifier associated with the user equipment. In other more specific embodiments, the at least one location identifier includes a cell identifier. In more specific embodiments, the cell identifier includes one or more of a 3GPP cell identifier, a tracking area identifier, a routing area identifier, a service set identifier (SSID) associated with a wireless local area network (WLAN) access point, and a media access control (MAC) address associated with a WLAN access point.

In more specific embodiments, the list is received by the user equipment device via one or more of Non-Access Stratum (NAS) messaging and an access network discovery and selection function (ANDSF) S14 interface. In other more specific embodiments, the user equipment device receives the list from a second network node. In more specific embodiments, the second network node includes at least one of a serving GPRS support node (SGSN), a mobile management entity (MME), an Evolved Packet Data Gateway (ePDG), and a Trusted Wireless Access Gateway (TWAG). In other more specific embodiments, the first network node includes a packet data network (PDN) gateway (PGW) and/or a policy and charging rules function (PCRF). In other more specific embodiments, the location reporting message includes the location identifier broadcast by the wireless network element as a trusted cell identifier.

An example non-transitory tangible media encoding logic includes instructions for execution that, when executed by a processor, is operable to perform operations comprising receiving, by a user equipment device, a list including at least one location identifier associated with an area for location reporting and an area identifier identifying the area for location reporting. the operations further include receiving, by the user equipment device, a location identifier broadcast by a wireless network element, and determining, by the user equipment device, whether the broadcast location identifier matches the at least one location identifier associated with the area for location reporting. The operations further include sending, by the user equipment device, a location reporting message to a first network node when it is determined that the broadcast location identifier matches the at least one location identifier associated with the area for location reporting. The location reporting message is indicative of the user equipment device either entering or exiting the area for location reporting.

An example apparatus includes a memory element for storing data, and a processor that executes instructions associated with the data. The processor and memory element cooperate such that the apparatus is configured for receiving a list including at least one location identifier associated with an area for location reporting and an area identifier identifying the area for location reporting. The apparatus is further configured for receiving a location identifier broadcast by a wireless network element, and determining whether the broadcast location identifier matches the at least one location identifier associated with the area for location reporting. The apparatus is still further configured for sending a location reporting message to a first network node when it is determined that the broadcast location identifier matches the at least one location identifier associated with the area for location reporting. The location reporting message is indicative of the apparatus either entering or exiting the area for location reporting.

Another example method is provided in one embodiment and includes sending, to a user equipment device, a list including at least one location identifier associated with an area for location reporting and an area identifier identifying the area for location reporting. The method further includes receiving a location reporting message indicative of the user equipment device either entering or exiting the area for location reporting, wherein the user equipment is configured to send the location reporting message responsive to determining that a location identifier broadcast by a wireless network element matches the at least one location identifier associated with the area for location reporting.

EXAMPLE EMBODIMENTS

Referring now to FIG. 1, FIG. 1 is a simplified block diagram of a communication system 100 for location reporting of user equipment in a cellular network environment in accordance with one embodiment of the present disclosure. FIG. 1 includes user equipment (UE) 102, a first long term evolution (LTE) evolved Node B (eNodeB) 104a, a second LTE eNodeB 104b, a third LTE eNodeB 104c, a fourth LTE eNodeB 104d, a serving GPRS support node (SGSN)/mobile management entity (MME) 106, a home subscriber server (HSS) 108, a serving gateway (SGW) 110, a packet data network (PDN) gateway (PGW) 112, a policy and charging rules function (PCRF) 114, and one or more packet networks 116. In particular embodiments, SGSN/MME 106, HSS 108, SGW 110, PGW 112, and PCRF 114 form part of an evolved packet core (EPC) network 118.

In at least one embodiment, UE 102 is a mobile device having the ability to communicate with and handover between one or more of LTE eNodeB 104a-104d using one or more mobile wireless connections. In accordance with various embodiments, UE 102 may include a computer (e.g., notebook computer, laptop, tablet computer or device), a tablet, a cell phone, a personal digital assistant (PDA), a smartphone, or any other suitable device having the capability to communicate using wireless access technologies with one or more of LTE eNodeB 104a-104d. Each of LTE eNodeB 104a-104d is in further communication with SGSN/MME 106. Among other things, SGSN/MME 106 provides tracking area list management, idle mode UE tracking, bearer activation and deactivation, serving gateway and packet data network gateway selection for UEs and authentication services. Although the particular embodiment illustrated in FIG. 1 shows a network node including both SGSN/MME capability, it should be understood that in other embodiments an MME only may be used. SGSN/MME 106 is in communication with HSS 108 which includes a database that contains user-related and subscription-related information. HSS 108 may perform functionalities such as mobility management, call and session establishment support, user authentication and access authorization.

Each of LTE eNodeB 104a-104d and SGSN/MME 106 are in further communication with SGW 110. SGW 110 routes and forwards user data packets, while also acting as the mobility anchor for the user plane during inter-eNodeB/inter-RAT handovers and as the anchor for mobility between LTE and other 3GPP technologies. SGW 110 is in further communication with PGW 112. PGW 112 provides connectivity from UE 102 to external packet data network(s) 116 by being the point of exit and entry of traffic for UE 102. PGW 112 is in further communication with PCRF 114. PCRF 114 aggregates information to and from the network, operational support systems, and other sources (such as portals) in real time, supporting the creation of rules and then automatically making policy decisions for each subscriber such as quality of service (QoS) levels, and charging rules. Although various embodiments are described herein using an LTE access network, it should be understood that in other embodiments the principles described herein may be applied to other radio access networks such as 4G/3G, etc. In the particular embodiment illustrated in FIG. 1, an RNC and NodeB are not shown for a UMTS system. In particular described embodiments, whenever an SGSN is referred to, it is assumed to be connected to an RNC and the RNC connected to a NodeB. The SGSN is not assumed to be connected to an eNodeB.

Before detailing some of the operational aspects of FIG. 1, it is important to understand different scenarios involving location of user equipment in a mobile network. The following foundation is offered earnestly for teaching purposes only and, therefore should not be construed in any way to limit the broad teachings of the present disclosure.

The location of the user equipment (UE) within the mobile network is an important piece of information for location based policy and charging. Hence, the 3rd Generation Partnership Project (3GPP) has defined a mechanism for reporting the location of the UE with cell level granularity, while the IE is in ECM-CONNECTED/PMM-CONNECTED/GRPS-READY state, since the beginning of the Evolved Packet System (EPS) architecture. Besides those basic use cases of location reporting for location based policy and charging, new use cases have emerged which require the network to have the current location of UE even when the UE is in ECM-IDLE/PMM-IDLE/GPRS-STANDBY state. An example use case is for location based content delivery in which the current location of the UE is useful for pushing information such as offers and advertisements based upon the location of the UE, e.g. delivering offers and coupons when the user enters a supermarket or a mall. Another example use case is using the location of the UE to activate services in other devices in the vicinity of the user. For example, based on the UE's current location, other devices in the UE's vicinity can be activated to perform specific pre-defined task, e.g. when the user is reaching his or her home, a heater or a coffee machine within a home of the user may be triggered with a pre-provisioned program so that the corresponding service is ready when the user actually arrives at the home. Accordingly, knowing the location of the UE when the UE is in ECM-IDLE/PMM-IDLE/GPRS-STANDBY state is also very important for enabling new services and revenue streams.

3GPP has defined location reporting procedures for network based location reporting of the UE in the active mode since Release 8 of the 3GPP specification. In 3GPP Release 8 based location reporting, the policy and charging rules function (PCRF) and/or packet data network gateway (PGW) activates location reporting for a given UE with different levels of location granularity such as by Cell identifier (ID), Tracking Area ID or Routing Area ID. When the mobility serving GPRS support node (SGSN)/management entity (MME) detects a change of the UE's location, it may report the change in location to the PGW/PCRF. Since the cell ID/tracking area (TA)/routing area (RA) of the UE is known only during the active mode, the SGSN/MME cannot report the location of the UE if the UE changes its location (e.g., by entering or leaving a cell/TA/RA) during the idle mode.

Since existing 3GPP Release 8 location reporting procedures may generate a large amount of control plane signaling (and hence potentially cause overload of the network), the 3GPP attempted to develop improvements and correspondingly defined new procedures in 3GPP Release 12. In 3GPP Release 12, Presence Reporting Area based location reporting was specified in which the PCRF/PGW provides a "Presence Reporting Area", in terms of a list of cell ID/TA/RA, for a given UE. In this procedure, the SGSN/MME notifies the network when the UE enters or leaves the area defined by "Presence Reporting Area" only when the UE is involved in either ECM-CONNECTED mode or Tracking area update singnallingsignaling. In addition, only one "Presence Reporting Area" can be defined per UE.

Figure 2:
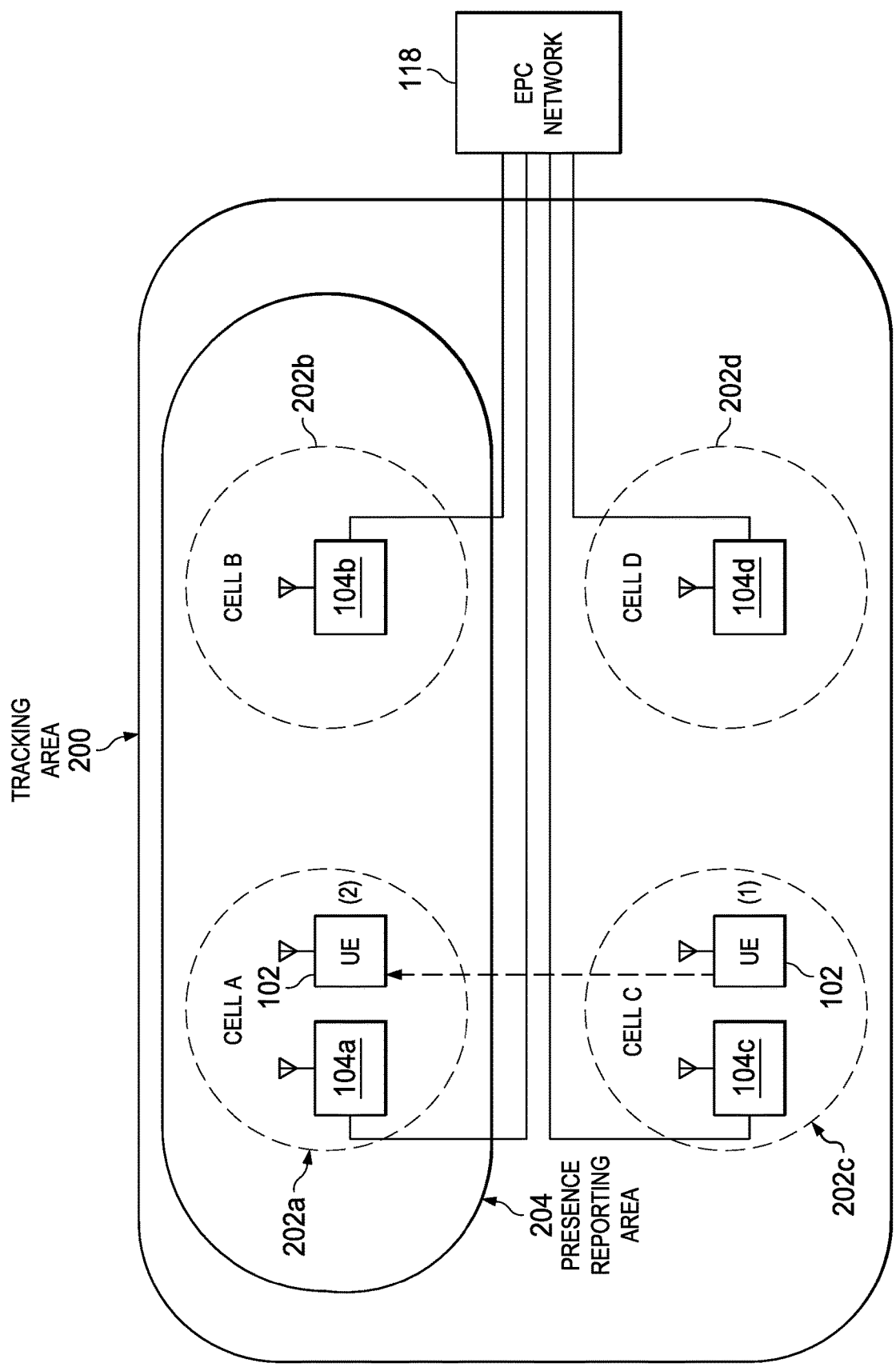
FIG. 2 illustrates an example existing operation for user equipment (UE) location reporting for a presence reporting area in a cellular network environment.

Referring now to FIG. 2, FIG. 2 illustrates an example existing operation for user equipment (UE) location reporting for a presence reporting area in a cellular network environment. FIG. 2 shows a tracking area 200 including four cells 202a-204d. Cell A (202a) includes first LTE eNodeB 104a, cell B (202b) includes second LTE eNodeB 104b, cell C (202c) includes third LTE eNodeB 104c, and cell D (202d) includes fourth LTE eNodeB 104d. Each of first LTE eNodeB 104a, second LTE eNodeB 104b, third LTE eNodeB 104c, and fourth LTE eNodeB 104d are in communication with EPC network 118. FIG. 2 further shows a presence reporting area (PRA) 204 encompassing cell A (202a) and cell B (202b). In the particular embodiment illustrated in FIG. 2, presence reporting area (PRA) 204 is defined by a list including cell IDs identifying cell A (202a) and cell B (202b), and tracking area 200 is defined by a list of cell IDs identifying cell A (202a), cell B (202b), cell C (202c), and cell D (204d). In other examples, presence reporting area (PRA) 204 and/or may be defined using tracking area (TA) or routing area (RA) identifiers.

In existing 3GPP location reporting procedures involving reporting of cell or routing/tracking area changes, a PCRF/OCS/PGW can request the serving nodes to report changes of cell ID (CGI/ECGI)/Serving Area (SAI)/Routing Area (RAI)/Tracking Area (TAI) for a given UE, and an SGSN/MME may be configured to only report changes in active mode only when the UE establishes active radio bearers. However, such reporting leads to a significant increase in signaling load and should only be applied for a limited set of subscribers as explicitly warned in TS 23.060/23.401. For LTE in idle mode, a change of cell can only be reported in the case of a change of tracking area lists (i.e. when the UE performs a tracking area update (TAU) in a tracking area identity (TAI) that was not part of its tracking area list). For UTRAN/GERAN in idle mode, a change of cell can only be reported in the case of a change of routing area (i.e. when the UE performs a routing area update (RAU)).

In existing 3GPP location reporting procedures involving reporting for presence reporting areas, such procedures only report whether the UE is inside or outside a given presence reporting area (PRA) 204. The presence reporting area 204 is defined as a list of cell IDs (CGI, ECGI), Serving Area IDs (SATs), eNodeB IDs, RAIs, or TAIs, and can either be predefined in SGSN/MME 106 or is dynamically signaled from PCRF 114 to SGSN/MME 106. Existing procedures assume homogeneous support of PRA reporting within a PLMN (i.e. all involved EPC nodes need to support PRA reporting), and PCRF 114 is configured with whether PRA is supported homogeneously in E-UTRAN/UTRAN/GERAN. In addition, PRA reporting feature is supported only for the non-roaming case. PCRF 114 can request ULI reporting on the PRA level and either provides the definition of the PRA (short list of cell IDs, TAs/RAs) and the PRA ID, or provides only the PRA ID (in which case the cell IDs, RAs/TAs, that constitute a PRA are pre-defined in the SGSN/MME 106). When UE 102 enter or leaves the PRA 204, SGSN/MME 106 sends the PRA ID and an indication of whether UE 102 is entering or leaving the area to PGW 112 and subsequently PCRF 114.

Limitations of existing UE location reporting for presence reporting areas is that only one presence reporting area can be supported per UE, and in idle mode a location report is only sent if there is signaling between the UE and the network. Referring again to FIG. 2 in an example procedure, PRA 204 is defined on a cell ID level including cell IDs associated with cell A 202a and cell B 202b. Tracking area 200 includes Cell A 202a, Cell B 202b, Cell D 202c, and Cell D 202d. In such a situation, a location report is only sent if UE 102 performs the TAU procedure in one of the PRA cells. If UE 102 performs the TAU procedure in a different cell of the same tracking area first, and then moves to one of the PRA cells without becoming active, a PRA location report is not sent. For example, if at a first step (1) UE 102 starts within cell C 102 and performs a TAU procedure, if UE 102 moves to cell A 202a in idle mode in a second step (2), no location report is sent to EPC network 118 indicating that UE 102 has moved into PRA 204. In certain situations, this could be avoided by aligning tracking areas and PRA reporting areas; however, this is very cumbersome and does not work if PRA areas are different for different subscribers. For small PRAs this would mean small TAs, which increases signaling significantly. Accordingly, in idle mode of UE 102 SGSN/MME 106 only knows the UE location on TA list granularity. Thus, if UE 102 is in idle mode, a location report is only sent if UE 102 performs a Tracking Area Update (TAU) in one of the PRA cells or PRA TAs. The location report gets sent only once the UE becomes Active in one of the PRA cells/PRA TAs. In theory, this could be avoided by disabling the "TAI list" feature. However, this increases mobility related signaling significantly.

Existing location reporting solutions only address the case when the UE is in an ECM-CONNECTED mode, i.e. when the S1 connection is established for the UE. During idle mode, the location of the UE is only known with the granularity of the tracking area identity (TAI) list which could span multiple cell IDs and hence a large geographical area. This is inadequate for enabling the push type of the services as mentioned above. For pushing location based content or for activating other devices in the UE's vicinity, the location of the UE is required to be known with cell level granularity, irrespective of whether the UE is in active or idle mode. In addition, considering the range of the idle timer at the Evolved Node B (eNodeB)—in the range of 5-10 seconds—the UEs are quickly moved from active to the idle mode when they are not passing any data. As a result, the value of active mode location reporting, as defined by 3GPP, diminishes further since the UE is in idle mode for most of the time.

Application based over-the-top (OTT) solutions exist in which a client installed at the UE monitors the UE's location (e.g. based on the current cell ID or based on GPS signal reception) and pushes the UE's to the application server when the UE enters or leaves the location of interest. However, these OTT solutions cannot be completely reliable since the location information is provided by the UE and not verified by the network. Further, each application has to define its own monitoring and reporting solution which increases overall signaling from the UE and possibly results in faster battery drain of the UE, and increased expenditure to the subscriber of UE due to frequent cellular data usage. Instead, the cellular operator desires a network based solution that is reliable for delivering the location of the UE (without involving cellular data usage and using only cellular control plane information) to one or more third party applications based on a subscribe-notify type of model for enabling new revenue streams for the cellular operator and make the network more intelligent instead of simply a data pipe.

Accordingly, to enable the push type of location based services, the UE's location determined by the network to ensure reliability is required to be known with a cell level granularity in active as well as in idle mode. Since 3GPP based solutions only address connected mode location reporting, they are inadequate for many practical purposes. Hence there is a need for a network based location reporting solution with cell level granularity, irrespective of whether the UE is in connected or idle mode.

Various embodiments described herein provide for network based location reporting of user equipment. In one or more embodiments, one or more components of the service platform/network determines an area for location reporting (AFLR) for one or more UE representative of a "location of interest" for which it is desired to know whether the UE has entered and/or exited. In particular embodiments, the AFLR can be defined in terms of one or more 3GPP cell identifiers, such as Cell ID, Tracking Area ID, Routing Area ID, or in terms of one or more WLAN cell identifiers, such as an service set identifier (SSID), an AP's media access control (MAC) address, etc. In general, various embodiments may use any identifier of a cell for an AFLR which can be resolved into a geographical location and which is broadcast by the radio nodes (i.e. eNodeB, BTS, or WLAN AP) such that it is available to the UE without it activating radio bearers. Each AFLR can be a single cell identifier (i.e. identifying a specific geographical location) or a list of cell identifiers of neighboring cells (i.e. identifying a larger geographical area). The AFLR for a given UE can be defined by network entities which need to know the UE's location, such as an operator's or a third party application provider's service delivery platform. For a given UE, in particular embodiments the AFLR definition may be delivered from the service delivery platform to the 3GPP network via subscribe-notify type of methods over the Rx type of interface. In other words, the service delivery platform may request the 3GPP network to notify the corresponding third party application when the UE enters or leaves an area defined by an AFLR.

In various embodiments, one or more components of EPC network 118 delivers a list of AFLRs to UE 102. In particular embodiments, PGW 112 and/or PCRF 114 delivers a list of AFLRs for the given UE 102 to the SGSN/MME 106. Subsequently, SGSN/MME 106 delivers the list of AFLRs to UE 102 via Non-Access Stratum (NAS) messaging. In that case, the same may be provided to the SGSN/MME 106 as well, separately, e.g. via GTP-C signaling. Alternatively, an access network discovery and selection function (ANDSF) based approach may be used to deliver the list of AFLRs to UE 102 via an S14 interface. In particular embodiments, UE 102 and SGSN/MME 106 may save the list of AFLRs locally. In particular embodiments, SGSN/MME 106 may use the list of AFLRs for active mode location reporting while UE 102 may use the list of AFLRs for idle mode location reporting. In still other embodiments, UE 102 may use the list of AFLRs for both active mode and idle mode location reporting.

After receiving the list of AFLRs, in one or more embodiments, UE 102 monitors its location by comparing the cell identifier it is currently camped on (i.e. for a 3GPP network) or it is currently able to receive the signal from (i.e. for the WLAN network) with the cell identifiers associated with a particular AFLR within the list of AFLRs. If there is a match, on entering or leaving of the cell, then UE 102 concludes that the network is interested in knowing the current location of UE 102.

In accordance with one or more embodiments, when UE 102 determines that the current location matches a cell identifier associated with one of the AFLRs, UE 102 initiates a 3GPP procedure to trigger the reporting of UE 102 entering or leaving the corresponding AFLR to EPC network 118. In particular embodiments, the reporting procedure may use a newly defined NAS procedure or a non-periodic Tracking Area or Routing Area Update procedure initiated by UE 102 with a special cause "reporting of the AFLR". In one or more embodiments, the NAS procedure may automatically make the cell ID of UE 102 available to the SGSN/MME 106. Based on the indication from UE 102, SGSN/MME 106 knows that UE 102 has triggered this procedure for reporting of the AFLR. Correspondingly, SGSN/MME 106 initiates appropriate signaling towards PGW 112 and/or PCRF 114 and makes the cell ID of UE 102 available to the network. In one or more embodiments, PGW 112 and/or PCRF 114 compares the cell ID with the list of AFLR and delivers the location information to a third party application which has subscribed for notification of the corresponding AFLR.

In particular embodiments, UE 102 may use this procedure only when UE 102 is in idle mode, and for active mode, the existing 3GPP solution can be used, i.e. the SGSN/MME 106 knows the current location of UE when UE 102 is in active mode. Accordingly, if there is a match between the current location of UE 102 and a location identifier associated with an AFLR, the SGSN/MME 106 reports the same to PGW 112 and/or PCRF 114. In still other embodiments, UE 102 may perform the above-described procedure regardless of whether UE 102 is in the active mode or the idle mode.

In accordance with particular embodiments, an AFLR derived for providing location based push services, in terms of a location identifier such as a 3GPP cell ID, WLAN SSID or WLAN AP's MAC address, is provided to UE 102 via a NAS interface, an ANDSF based S14 interface, or other suitable interface. In particular embodiments, UE 102 monitors when it enters or leaves an area where one of these location identifiers (IDs) associated with an AFLR is broadcast by a radio node. Correspondingly, UE 102 initiates NAS signaling or other suitable signaling towards the network allowing the network to retrieve the current location of UE 102 and make it available to a third party application. This in turn, enables the network to accurately provide the location of UE 102 even if UE 102 is in idle mode and hence facilitates location based push services.

Figure 3:
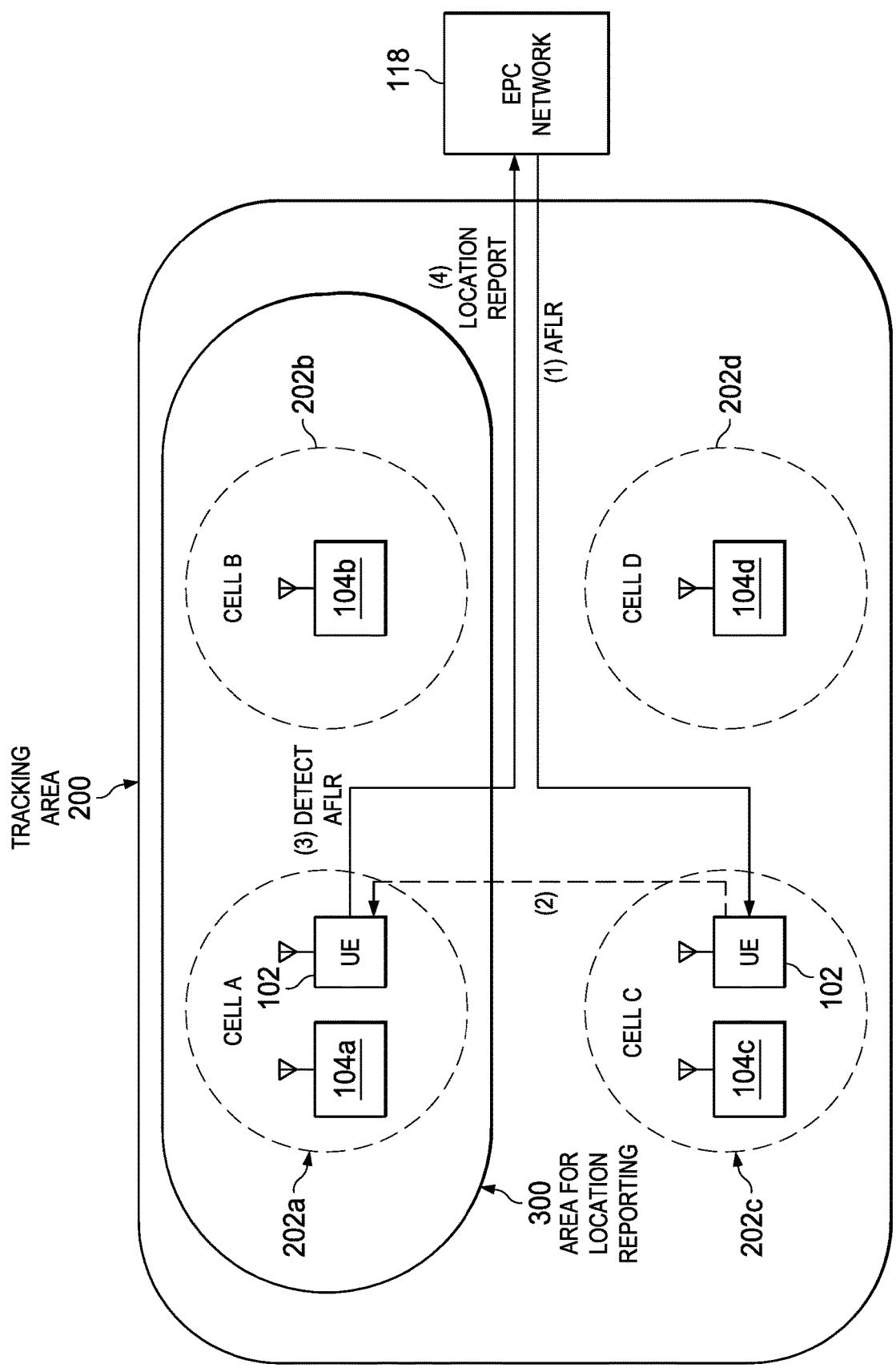
FIG. 3 is a simplified block diagram of a procedure for location reporting of user equipment in a cellular network environment in accordance with one embodiment of the present disclosure.

Referring now to FIG. 3, FIG. 3 is a simplified block diagram of a procedure for location reporting of user equipment in a cellular network environment in accordance with one embodiment of the present disclosure. FIG. 3 shows a tracking area 200 including four cells 202a-204d. Cell A (202a) includes first LTE eNodeB 104a, cell B (202b) includes second LTE eNodeB 104b, cell C (202c) includes third LTE eNodeB 104c, and cell D (202d) includes fourth LTE eNodeB 104d. Each of first LTE eNodeB 104a, second LTE eNodeB 104b, third LTE eNodeB 104c, and fourth LTE eNodeB 104d are in communication with EPC network 118. FIG. 3 further shows an Area For Location Reporting (AFLR) 300 encompassing cell A (202a) and cell B (202b). In accordance with various embodiments, the Area For Location Reporting (AFLR) is a geographical area or "location of interest" in which the presence of particular user equipment, such as UE 102, is desired and/or required to be known by an operator of EPC network 118 in order to invoke some service or function, such as push services, provided by EPC network 118 when the UE is determined to be within the AFLR. In the particular embodiment illustrated in FIG. 3, area for location reporting 300 is defined by a list including cell IDs identifying cell A (202a) and cell B (202b), and tracking area 200 is defined by a list of cell IDs identifying cell A (202a), cell B (202b), cell C (202c), and cell D (204d).

Although FIG. 3 illustrates UE 102 having a single associated AFLR 300, it should be understood that in other embodiments UE 102 may be associated with more than one AFLR. In one or more embodiments, each AFLR is defined by a list of one or more identifiers associated with a geographical area such as a cell ID, service area identifier (SAI), cell global identity (CGI), enhanced CGI (ECGI), tracking area identifier (TAI)/routing area identifier (RAI), a WLAN AP's MAC address, and/or WLAN SSID. In accordance with one or more embodiments, each AFLR is assigned unique AFLR ID. In one example, a particular AFLR is assigned an AFLR ID=1 and includes a list of ECGI=1, 3, 5, 6 as geographical identifiers included within the AFLR. In another example, another particular AFLR is assigned an AFLR ID=2 and includes a list of TAI=1, 2, 3 as geographical identifiers included within the AFLR.

In an example procedure for location reporting of user equipment as shown in FIG. 3, EPC network 118 identifies a list of AFLRs for a particular UE 102. In particular embodiments, the list of AFLRs may be determined by local configuration at the PCRF/ANDSF, or information received from a third-party application, such as over a Service Capability Exposure framework (SCEF). The list of AFLRs includes one or more AFLR for the particular UE 102. In the particular embodiment illustrated in FIG. 3, the list of AFLRs includes AFLR 300 including identifiers for cell A (202a) and cell B (202b). In a procedure (1), UE 102 receives and is configured with the list of AFLRs from EPC network 118. In particular embodiments, UE 102 may receive the list of AFLRs via NAS based signaling, or an S14 interface from the ANDSF. In the example illustrated in FIG. 2, UE 102 begins within Cell C 202a. In various embodiments, UE 102 monitors when it enters and leaves any of the AFLRs identified within the list of AFLRs by detecting broadcast of the identifiers associated with the AFLR. In particular embodiments, for cellular-based cells the ECGI/SAI/CGI and/or TAI/RAI are broadcast by the eNodeBs, such as eNodeB 104a-104d, wirelessly as part of a periodic LTE System Information Block 1 (SIB1) broadcast. Accordingly, even when UE 102 is in idle mode it may receive the broadcasts and is thus aware of the identity of the cell/tracking area. For WiFi-based cells, UE 102 may include a WiFi client configured to scan for the SSID and AP's MAC address for the WiFi network in range of UE 102.

UE 102 is further configured to detect if it has entered/left one of the AFLRs identified in the list of AFLRs. In one or more embodiments, when UE 102 detects that the cell's radio signal strength is above/below a pre-configured threshold, it concludes that it entered/left that cell. If the cell's identity is part of one of the AFLRs, UE 102 concludes that it entered/left that AFLR. In the example illustrated in FIG. 3, in a procedure (2), UE 102 leaves coverage of cell C (202c) when it is in the idle mode and moves into coverage of cell A (202a). In a procedure (3), UE 102 receives and detects a cell identifier associated with cell A (202a), and determines that the cell identifier of cell A (202a) matches a cell identifier in AFLR 300. In a procedure (4), UE 102 performs a location reporting procedure to send a location report to EPC network 118 indicating that it has entered AFLR 300. In particular embodiments, the location report is similar to a "periodic TAU" procedure except that UE 102 provides the AFLR's ID and status=entered/left via NAS signaling. In one or more embodiments, this procedure may be performed irrespective of the idle/active status of UE 102.

In particular situations, if UE 102 moves between two locations frequently (e.g. at the border of an AFLR) it may generate frequent location reports and this may be unnecessary. Accordingly, in particular embodiments, UE 102 can be configured with a guard period, for example, per AFLR or per UE, to stop the location reports after the first report. In other particular embodiments, the network may maintain the UE's list of AFLRs in order to track and perform location reporting while UE 102 is in active mode in order to reduce UE to network signaling while UE 102 is in active mode. In particular embodiments, UE 102 may be configured to allow a user to selectively disable the location reporting operations described herein.

Figure 4:
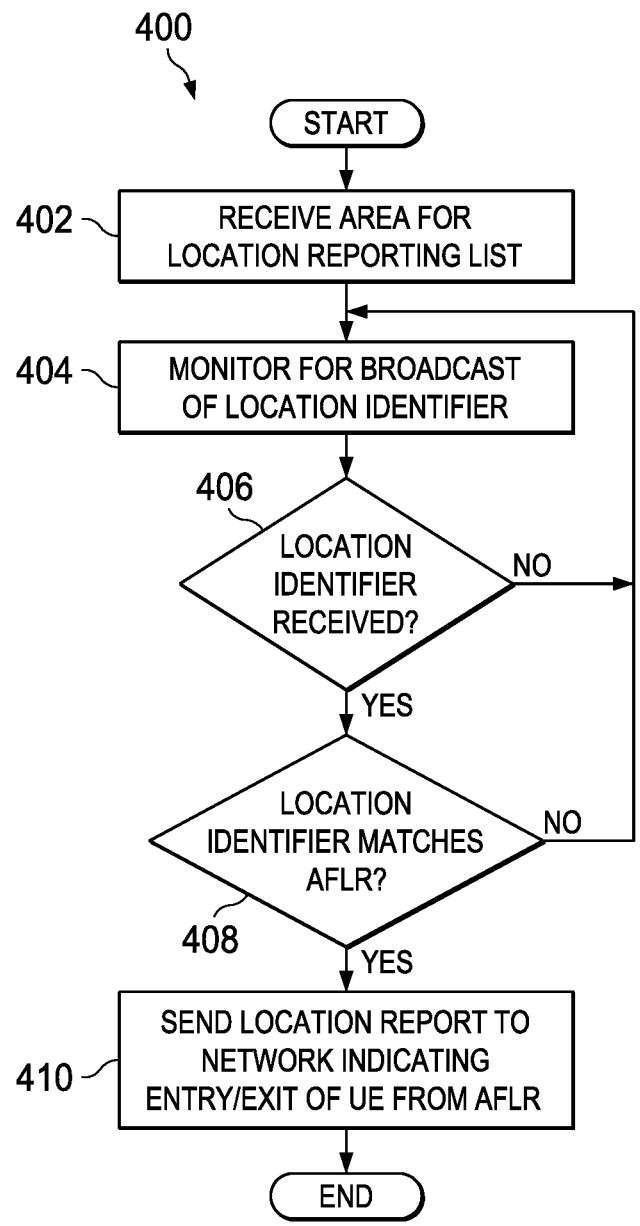
FIG. 4 is a simplified flow diagram illustrating example operations associated with location reporting of user equipment in a cellular network environment in one example embodiment of the communication system.

Referring now to FIG. 4, FIG. 4 is a simplified flow diagram 400 illustrating example operations associated with location reporting of user equipment in a cellular network environment in one example embodiment of communication system 100. In 402, UE 102 receives an area for location reporting list from EPC network 118. The area for location reporting (AFLR) list includes at least one area for location reporting identifier identifying an area for location reporting (AFLR) associated with UE 102. The AFLR list further includes one or more location identifiers associated with each AFLR. In particular embodiments, the location identifiers may include a cell identifier, a tracking area identifier, a routing area identifier, an SSID associated with a wireless access point, and a MAC address associated with a wireless access point. In particular embodiments, the AFLR list may be locally configured at EPC network 118 at a PCRF/ANDSF. In other particular embodiments, the AFLR list may be received from a third-party application.

In 404, UE 102 monitors for the broadcast of a location identifier within the current location of UE 102. In particular embodiments, the location identifier is broadcast from a wireless network element such as an eNode B, cellular base station, WiFi access point or any other suitable wireless access point. In particular embodiments, the ECGI/SAI/CGA and/or TAI/RAI are broadcast wirelessly as part of SIB1, and a WiFi client at the UE 102 scans for the SSID and MAC address of APs within WiFi network range. In 406, UE 102 determines whether it has received a location identifier. If UE 102 has not received a location identifier, the process returns to 404. If UE 102 determines that it has a received a location identifier, the flow 400 continues to 408. In 408, UE 102 determines whether the received location identifier matches a location identifier associated with a particular AFLR from the AFLR list. If UE 102 determines that the received location identifier does not match a location identifier associated with an AFLR, the flow 400 returns to 404. If UE 102 determines that the received location identifier matches a location identifier associated with an AFLR, the flow 400 continues to 410.

In 410, UE 102 sends a location report in the form of a location reporting message to one or more network nodes of EPC network 118 indicative of either entry or exit of UE 102 from the particular AFLR. The location reporting message includes the AFLR identifier (ID) and the status of UE 102 as either entered or exited the AFLR associated with the AFLR ID. The location reporting message may further include an identifier associated with UE 102. Flow 400 then ends.

Figure 5:
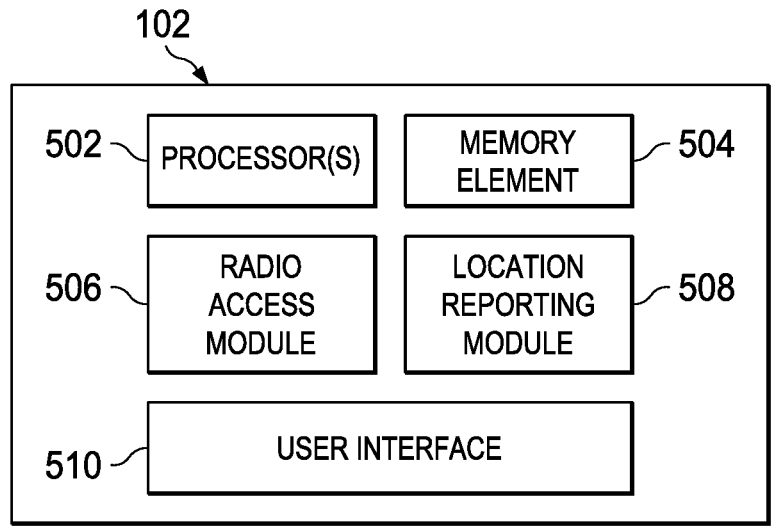
FIG. 5 illustrates an embodiment of user equipment (UE) of the communication system FIG. 1.

Referring now to FIG. 5, FIG. 5 illustrates an embodiment of user equipment (UE) 102 of communication system 100 of FIG. 1. UE 102 includes one or more processor(s) 502, a memory element 504, a radio access module 506, a location reporting module 508 and a user interface 510. Processor(s) 502 is configured to execute various tasks of UE 102 as described herein and memory element 504 is configured to store data associated with UE 102 such as an AFLR list as described herein. Radio access module 506 is configured to wirelessly communication with one or more of a radio access network and a WiFi network. Location reporting module 508 is configured to perform the operations associated with location reporting of UE 102 as described herein. User interface 510 is configured to a user interface to a user of UE 102 such as a display and one or more user input devices.

Figure 6:
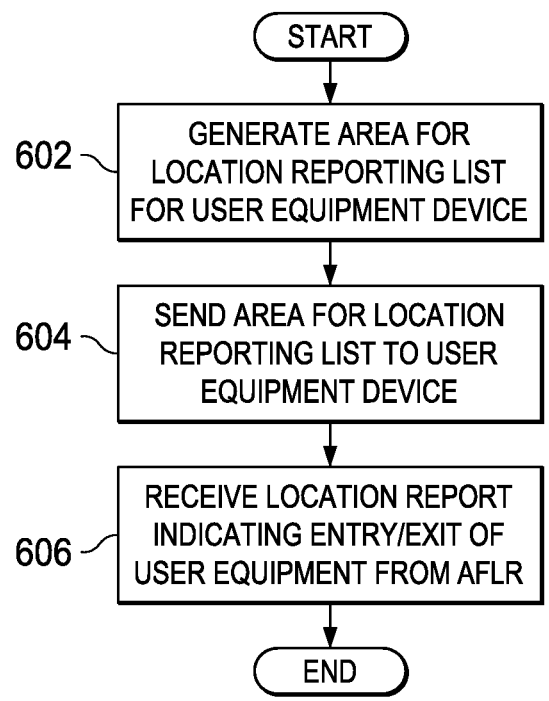
FIG. 6 is a simplified flow diagram illustrating other example operations associated with location reporting of user equipment in a cellular network environment in one example embodiment of the communication system.

Referring now to FIG. 6, FIG. 6 is a simplified flow diagram 600 illustrating other example operations associated with location reporting of user equipment in a cellular network environment in one example embodiment of communication system 100. In 602, an area for location reporting (AFLR) list is generated within the network for a particular user equipment device. The AFLR list includes at least one location identifier associated with an area for location reporting and an area identifier identifying the area for location reporting. In one or more embodiments, an AFLR for a given UE device may be defined by network entities which need to know the UE's location, such as an operator's or a third party application provider's service delivery platform. In particular embodiments, for a given UE one or more the AFLR definition may be delivered from the service delivery platform to the 3GPP network via subscribe-notify type of methods over the Rx type of interface. In other words, the service delivery platform may request the 3GPP network to notify the corresponding third party application when the UE enters or leaves an area defined by an AFLR.

In 604, a network entity, such as SGSN/MME 106, sends the list including the at least one location identifier associated with the area for location reporting and the area identifier identifying the area for location reporting to the particular user equipment device. In one or more embodiments, the user equipment device is configured to receive a location identifier broadcast by a wireless network element, and determine whether the broadcast location identifier matches the at least one location identifier associated with the area for location reporting. The user equipment is further configured to send a location reporting message to the network entity responsive to determining that the location identifier broadcast by the wireless network element matches the at least one location identifier associated with the area for location reporting.

In 606, the network entity receives the location reporting message indicative of the user equipment device either entering or exiting the area for location reporting from the user equipment device. The flow 600 then ends. In other embodiments, the network entity may include an Evolved Packet Data Gateway (ePDG) as an access-side gateway for an untrusted WLAN and/or a Trusted Wireless Access Gateway (TWAG) as an access-side gateway for a trusted WLAN. In particular embodiments, the AFLR can be conveyed to the UE from an ePDG link using an Internet Key Exchange (IKEv2) protocol, and/or to the UE from the TWAG through a UE to TWAG link using an Extensible Authentication Protocol (EAP) or Wireless LAN control plane protocol (WLCP).

In one implementation, UE 102 is a network element and/or device that includes software to achieve (or to foster) the location reporting operations, as outlined herein in this Specification. Note that in one example, each of these elements can have an internal structure (e.g., a processor, a memory element, etc.) to facilitate some of the operations described herein. In other embodiments, these operations may be executed externally to this element, or included in some other network element to achieve this intended functionality. Alternatively, UE 102 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Some particular embodiments may provide one or more advantages. One advantage that may be provided by particular embodiments is that location reporting of the UE may be performed when the UE is in idle mode as well as when the UE is in active mode. Accordingly, the UE's location may be accurately available irrespective if it is in active mode or idle mode. Another advantage that may be provided by particular embodiments is that it may provide increased reliability in location reporting of the UE. Since the network may provide the UE's location in terms of the cell ID from which the UE has initiated the signaling to report its location, the location information can be trusted since the UE cannot manipulate the same. Accordingly, the identifier of the source cell may be used as a trusted cell identifier for location reporting.

Another advantage that may be provided by particular embodiments is that it may enable new revenue streams for network operators by eliminating the need for each third party application provider to define its own solution for monitoring the UE's current location. Instead, the network operator can monetize the location reporting operations described herein as a service to one or multiple third party application providers. Another advantage that may be provided by particular embodiments is that it may offer a more efficient solution for location reporting as compared to an over-the-top (OTT) solution. OTT solutions generally make use of GPS to determine the UE's location and hence is battery consuming. In addition, OTT solutions also need a data connectivity to be setup for transferring the location information, which requires usage of E-UTRAN radio access bearers (E-RABs)/data radio bearers (DRBs) and hence wastage of radio resources. In contrast, the location identifier such as a cell ID where the UE is currently camping is always available to the UE, even in the idle mode.

Another advantage that may be provided by particular embodiments is that network overhead may be minimized. Since each UE maintains and monitors its own AFLR list, the network does not need to monitor the location of each UE of what may be a large number of UEs within a network, e.g. whether each UE entered or left a cell.

In regards to the internal structure associated with communication system 100, each of UE 102, LTE eNodeB 104a-104d, HSS 108, SGSN/MME 106, SGW 110, PGW 112, and PCRF 114 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to UE 102, LTE eNodeB 104a-104d, HSS 108, SGSN/MME 106, SGW 110, PGW 112, and PCRF 114 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the location reporting functions outlined herein may be implemented by logic encoded in one or more tangible media, which may be inclusive of non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols in which in order to provide hand-in access to a network. Moreover, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
  receiving, by a user equipment device, from a second network node, a list including a location identifier associated with an area for location reporting and an area identifier identifying the area for location reporting;

receiving, by the user equipment device while the user equipment device is in an idle mode, a broadcast location identifier broadcast by a wireless network element; and in response to determining that the broadcast location identifier matches the location identifier associated with the area for location reporting, sending, only while the user equipment device remains in the idle mode, from the user equipment device to a first network node using Non-Access Stratum (NAS) signaling, a location reporting message that includes the broadcast location identifier;

determining, by the user equipment device while the user equipment device remains in the idle mode, a duration of a specified guard period corresponding to the area for location reporting; and disabling, by the user equipment device while the user equipment device remains in the idle mode, sending of a subsequent location reporting message to the first network node for a duration of the specified guard period, wherein the user equipment device is configured with a respective specified guard period duration for each of a plurality of areas for location reporting.

2. The method of claim 1, wherein the location reporting message includes the area identifier identifying the area for location reporting and a status information field.

3. The method of claim 2, wherein the status information field includes a first indication indicating that the user equipment device has entered the area for location reporting when the user equipment device determines that the user equipment device has entered the area for location reporting, wherein the status information field includes a second indication indicating that the user equipment device has exited the area for location reporting when the user equipment device determines that the user equipment device has exited the area for location reporting.

4. The method of claim 1, wherein the location reporting message further includes an identifier associated with the user equipment device, and wherein the list is received by the user equipment device via an access network discovery and selection function (ANDSF) S14 interface.

5. The method of claim 1, wherein the user equipment device receives the list from a second network node, and wherein the second network node includes at least one of a serving GPRS support node (SGSN), an Evolved Packet Data Gateway (ePDG), and a Trusted Wireless Access Gateway (TWAG).

6. The method of claim 1, wherein the location reporting message includes the broadcast location identifier broadcast by the wireless network element as a trusted cell identifier.

7. The method of claim 1, wherein the location reporting message includes a status of one of entered or exited for an area for location reporting associated with the user equipment device.

8. A user equipment device, comprising:

a computer processor; and a memory storing computer program code that, when executed by operation of the computer processor, performs an operation comprising:

receiving from a second network node, a list including a location identifier associated with an area for location reporting and an area identifier identifying the area for location reporting;

receiving, only while the user equipment device is in an idle mode, a broadcast location identifier broadcast by a wireless network element;

in response to determining that the broadcast location identifier matches the location identifier associated with the area for location reporting, sending, only while the user equipment remains in the idle mode, from the user equipment device to a first network node using Non-Access Stratum (NAS) signaling, a location reporting message that includes the broadcast location identifier;

determining a duration of a specified guard period corresponding to the area for location reporting; and disabling sending of a subsequent reporting message to the first network node for a duration of the specified guard period, wherein the user equipment device is configured with a respective specified guard period duration for each of a plurality of areas for location reporting.

9. The user equipment device of claim 8, wherein the location reporting message includes the area identifier identifying the area for location reporting and a status information field.

10. The user equipment device of claim 9, wherein the status information field includes a first indication indicating that the user equipment device has entered the area for location reporting when the user equipment device determines that the user equipment device has entered the area for location reporting, wherein the status information field includes a second indication indicating that the user equipment device has exited the area for location reporting when the user equipment device determines that the user equipment device has exited the area for location reporting.

11. The user equipment device of claim 8, wherein the location reporting message further includes an identifier associated with the user equipment device, and wherein the list is received by the user equipment device via an access network discovery and selection function (ANDSF) S14 interface.

12. The user equipment device of claim 8, wherein the user equipment device receives the list from a second network node, and wherein the second network node includes at least one of a serving GPRS support node (SGSN), an Evolved Packet Data Gateway (ePDG), and a Trusted Wireless Access Gateway (TWAG).

13. The user equipment device of claim 8, wherein the location reporting message includes the broadcast location identifier broadcast by the wireless network element as a trusted cell identifier.

14. A user equipment device of claim 8, wherein the location reporting message includes a status of one of entered or exited for an area for location reporting associated with the user equipment device.

\* \* \* \* \*